Figure 2:
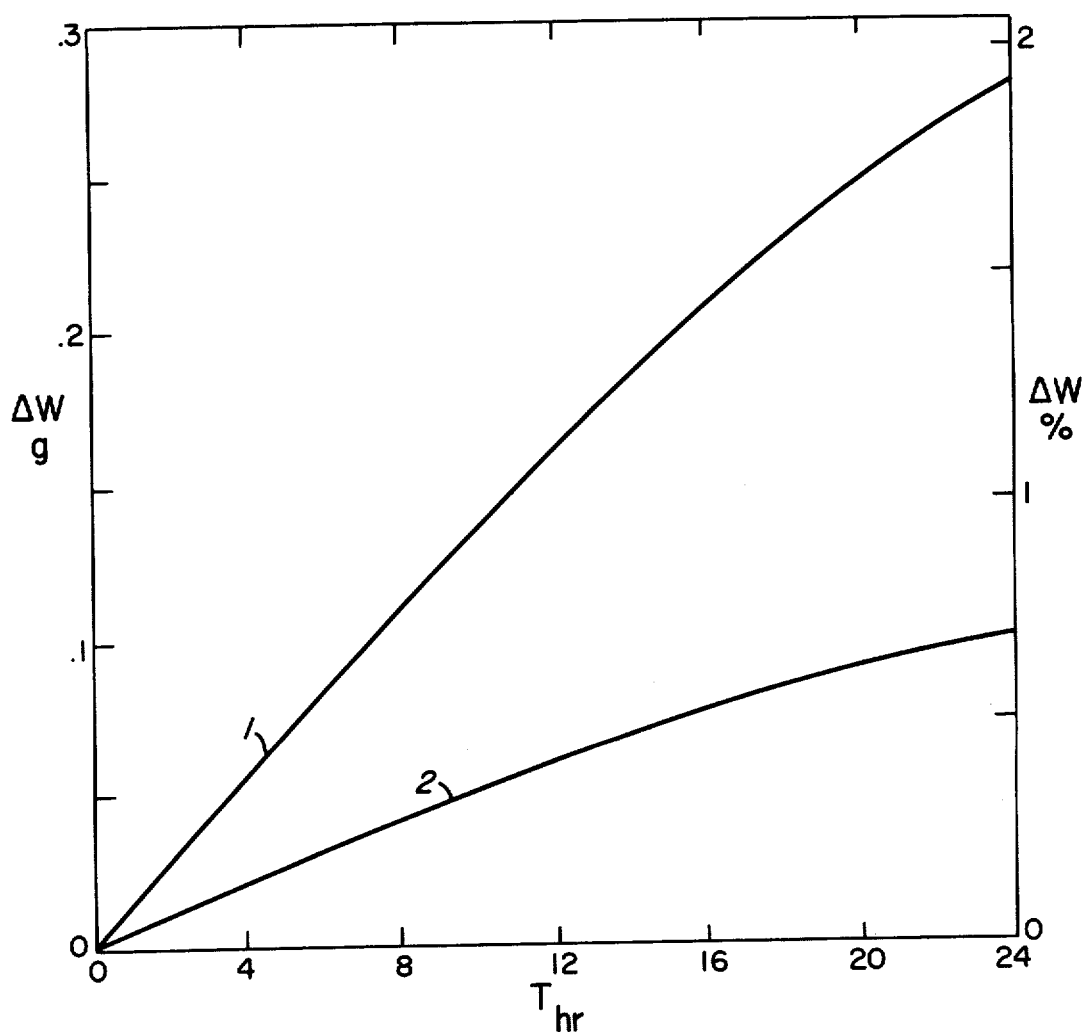

United States Patent [19]

Hill et al.

[11] 4,045,593
[45] Aug. 30, 1977

[54] METHOD FOR PRODUCING MOISTURE RESISTANT ELECTRODES

[75] Inventors: David C. Hill, Somers; Edith M. Flanigen, White Plains, both of N.Y.

[73] Assignee: Union Carbide Corporation, New York, N.Y.

[21] Appl. No.: 598,216

[22] Filed: Sept. 22, 1975

Related U.S. Application Data

[63] Continuation-in-part of Ser. No. 379,917, July 17, 1973, abandoned.

[51] Int. Cl.² .................. B05D 5/12; B05D 3/04
[52] U.S. Cl. .................................. 427/59; 427/61; 427/372 B; 427/344; 428/385; 428/386; 428/387
[58] Field of Search .............. 427/59, 61, 372, 344; 219/146; 29/191.6, 193; 428/385, 386, 387

[56] References Cited

U.S. PATENT DOCUMENTS

| | | | |
|---|---|---|---|
| 2,697,159 | 12/1954 | Donahey | 427/59 |
| 2,839,433 | 6/1958 | Kriewall | 427/59 |
| 3,084,074 | 4/1963 | Wasserman | 427/59 |
| 3,783,020 | 1/1974 | Kimura | 427/61 |
| 3,791,860 | 2/1974 | Zelley | 427/59 |

*Primary Examiner*—Michael F. Esposito
*Attorney, Agent, or Firm*—John R. Doherty

[57] ABSTRACT

A method of making flux-covered welding electrodes which are resistant to moisture absorption wherein untreated covered electrodes are treated with a dilute aqueous dispersion of at least one material taken from the class of silicon bearing materials consisting of colloidal amorphous solid silicas, quaternary ammonium colloidal silica sols and soluble silicates of lithium and potassium.

7 Claims, 6 Drawing Figures

F I G. 1
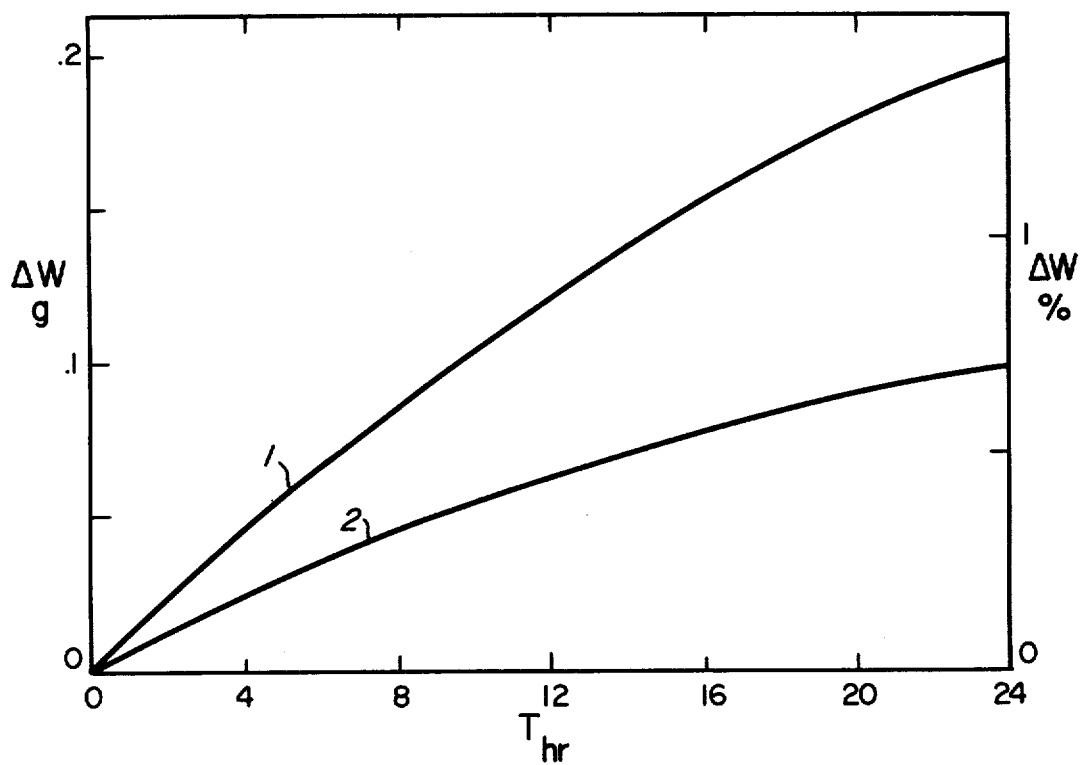
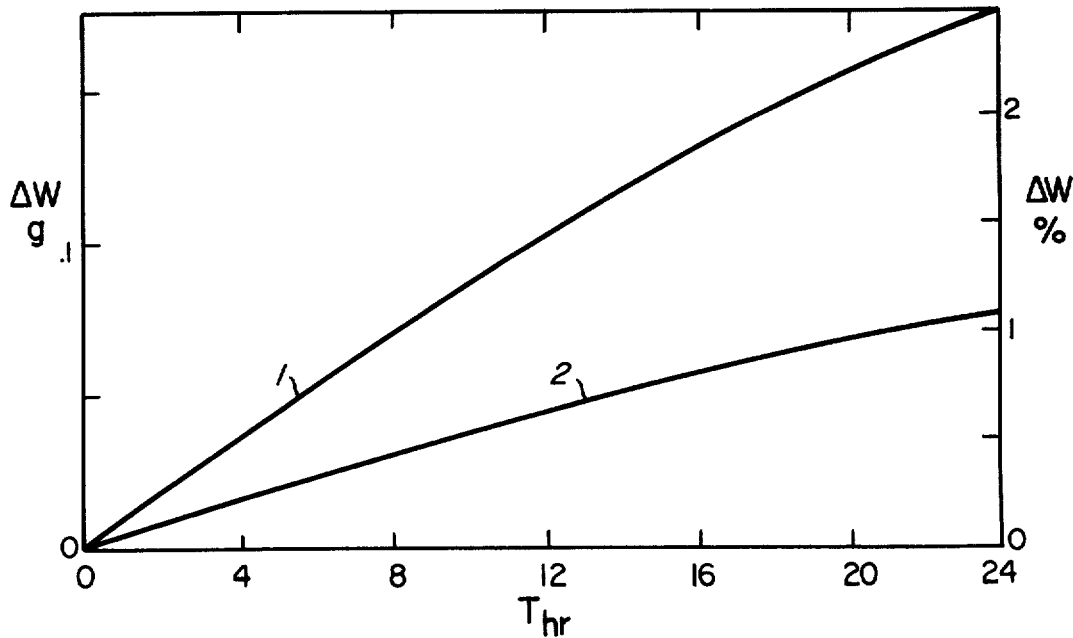
F I G. 4

METHOD FOR PRODUCING MOISTURE RESISTANT ELECTRODES

This application is a continuation-in-part of my prior and co-pending application Ser. No. 379,917 filed on July 17, 1973, now abandoned.

This invention relates to moisture resistant covered electrodes and more particularly to a method for producing such moisture resistant electrodes.

Covered electrodes, sometimes also referred to as stick electrodes, are manufactured to specific moisture levels. Broadly speaking there are two classes of such covered electrodes. The first class is the low-hydrogen type, used herein to mean electrodes such as low-hydrogen, low-alloy low-hydrogen or stainless steel electrodes. This class is manufactured to and supplied at low contained moisture levels (less than 0.6% by weight of the flux coating). These electrodes are usually supplied in hermetically sealed containers. The second class is the non-low-hydrogen class, used herein to include all other welding electrodes such as cellulosic, titania and iron oxide. This class is manufactured to and supplied at contained moisture levels from 0.6 to 5.0% by weight of the flux coating.

Once electrodes of either type are exposed to the atmosphere, they seek to equilibrate their contained moisture level with the moisture contained in the atmosphere. Variations of moisture level are undesirable. In the case of low-hydrogen electrodes, once a package of electrodes is opened the electrodes must be stored in a holding oven at temperatures in excess of 100° C or significant moisture absorption will occur. This moisture is transferred to the arc during welding and results in a weld deposit susceptible to hydrogen cracking. If electrodes are exposed to moisture they can be reconditioned by baking at about 455° C for about 1 hour. The necessity for such reconditioning of exposed electrodes is expensive. Use of exposed electrodes can result in defective weld metal. Accordingly, the development of a method for improving the moisture resistance of low-hydrogen type electrodes is of considerable commerical importance. Non-low-hydrogen electrodes are not used in conditions of high restraint where susceptibility to hydrogen cracking is important. These electrodes are designed to operate with some contained moisture content in the coating. However, these electrodes do not operate well if their moisture content is allowed to vary significantly. Accordingly, the development of a method for improving the control of moisture in non-low-hydrogen type electrodes is of considerable commercial importance.

It is therefore the object of this invention to provide a method for producing moisture resistant covered electrodes of the low-hydrogen type. It is a further object to provide a method for insuring control of moisture in covered electrodes of the non-low-hydrogen type.

These and other objects will either be pointed out or become apparent from the following description and drawings wherein FIGS. 1–6 are curves showing moisture adsorption for commercial prepared electrodes treated by the method of the invention.

It is theorized that moisture absorption in covered electrode coatings is due to the physical absorption of water by pores. These pores exist as a result of incomplete densification of the coating during manufacture. It has been discovered that if electrodes of the low-hydrogen type are treated with a dilute aqueous dispersion of at least one material taken from the class of silicon bearing materials consisting of colloidal amorphous solid silicas, quaternary ammonium colloidal silica sols and soluble silicates of lithium and potassium in the manner hereinafter described, the resistance of the coatings to moisture absorption is remarkably increased and can, in fact, approach totality. Similarly, it has been discovered that if electrodes of the non-low-hydrogen type are so treated, the moisture content of the coatings can be controlled more closely thereby insuring more uniform operability.

It is postulated that the phenomenon responsible for the production of moisture resistance in the treated electrodes is related to the formation of a film on the electrode coating's surface. This film fills the surface pores of the untreated electrode, thereby preventing moisture from being absorbed. In a similar manner, this film prevents moisture from being desorbed and can be used to control the quantity of moisture in the coating of a non-low-hydrogen electrode.

Because the phenomenon is thought to be related to film formation, it was believed that any material capable of formimg a film would be effective. However, it has been found that the objects of the invention are achieved when the treating dispersions are made from colloidal amorphous solid silicas, quaternary ammonium colloidal silica sols and soluble silicates of lithium and potassium. It has been found that soluble silicates of sodium produce no improvement in moisture control in the electrode coating. Colloidal amorphous solid silicas preferably having an ultimate particle size of less than 1 micrometer are such materials as fumed silicas, chemically precipitated silicas such as those known by trade names "Santocel," "CAB-O-SIL," "Hi-Sil" and "QUSO," and silicas precipitated from silica sols such as those known by trade names "Ludox," "Syton" and "Nalcoag." Quaternary ammonium colloidal silica sols have a weight ratio $SiO_2/(NR_4)_2O$ of 0.18/1.0 to 9.0/1.0. Soluble silicates of lithium have a weight ratio $SiO_2/Li_2O$ of 9.4/1.0 to 17.0/1.0. Soluble silicates of potassium have a weight ratio $SiO_2/K_2O$ of 1.8/1.0 to 2.5/1.0. The weight percent of $SiO_2$ in the silicates of both lithium and potassium can be readily calculated from the weight ratios indicated above. In the case of silicates of lithium, $SiO_2$ is present in a range of from about 90 to 95% by weight. In the case of silicates of potassium, $SiO_2$ is present in a range of from about 64 to 72% by weight.

In practice, commercially prepared low-hydrogen type electrodes were taken and soaked in an aqueous dispersion made from at least one material from the class of silicon bearing materials consisting of colloidal amorphous solid silicas, quaternary ammonium colloidal silica sols and soluble silicates of lithium and potassium. The electrodes were then dried to drive off any contained water. Specifically, electrodes were soaked in a dispersion of lithium silicate (weight ratio $SiO_2/Li_2O$ of 9.5/1.0 for 1 hour at room temperature (25° C)). The dispersion contined 6% by weight $SiO_2$. After soaking, the electrodes were dried at 455° C for 1 hour.

Other treatments were made on commerically prepared low-hydrogen and non-low-hydrogen electrodes. These treatments were variations of the one given above. For instance an aqueous dispersion made with a colloidal amorphous solid silica with 2% by weight $SiO_2$ was used. In general, successful treatments have been made with dispersions containing from about 1 to about 20% by weight $SiO_2$. Similarly, the treatment temperature may be varied between about 5° and about 95° C and treatment times from about 1 minute to 5 hours. Preferably the dispersion will contain close to 6% by weight $SiO_2$. Preferred treatment conditions are 65° C and 1 hour. The film may be applied by soaking, brushing or spraying. In some cases brushing or spraying will be more desirable.

The formation of the surface film is accomplished by mass transport of the silica/silicate through the solvent. Accordingly, time, temperature, solution concentration and solution agitation may be expected to affect the resultant moisture resistance. The film must be uniform. If the solution concentration is too high, flaky patches appear on the electrode coating. If the concentration is too low, inordinate amounts of time are required to achieve filming. Solution stirring or agitation helps insure a uniform coating. The rate of uptake at the surface increases with increasing temperature. The maximum temperature is limited by precipitation of the silica/silicate from solution. Time of treatment affects only the ultimate magnitude of the uptake.

Figure 3:
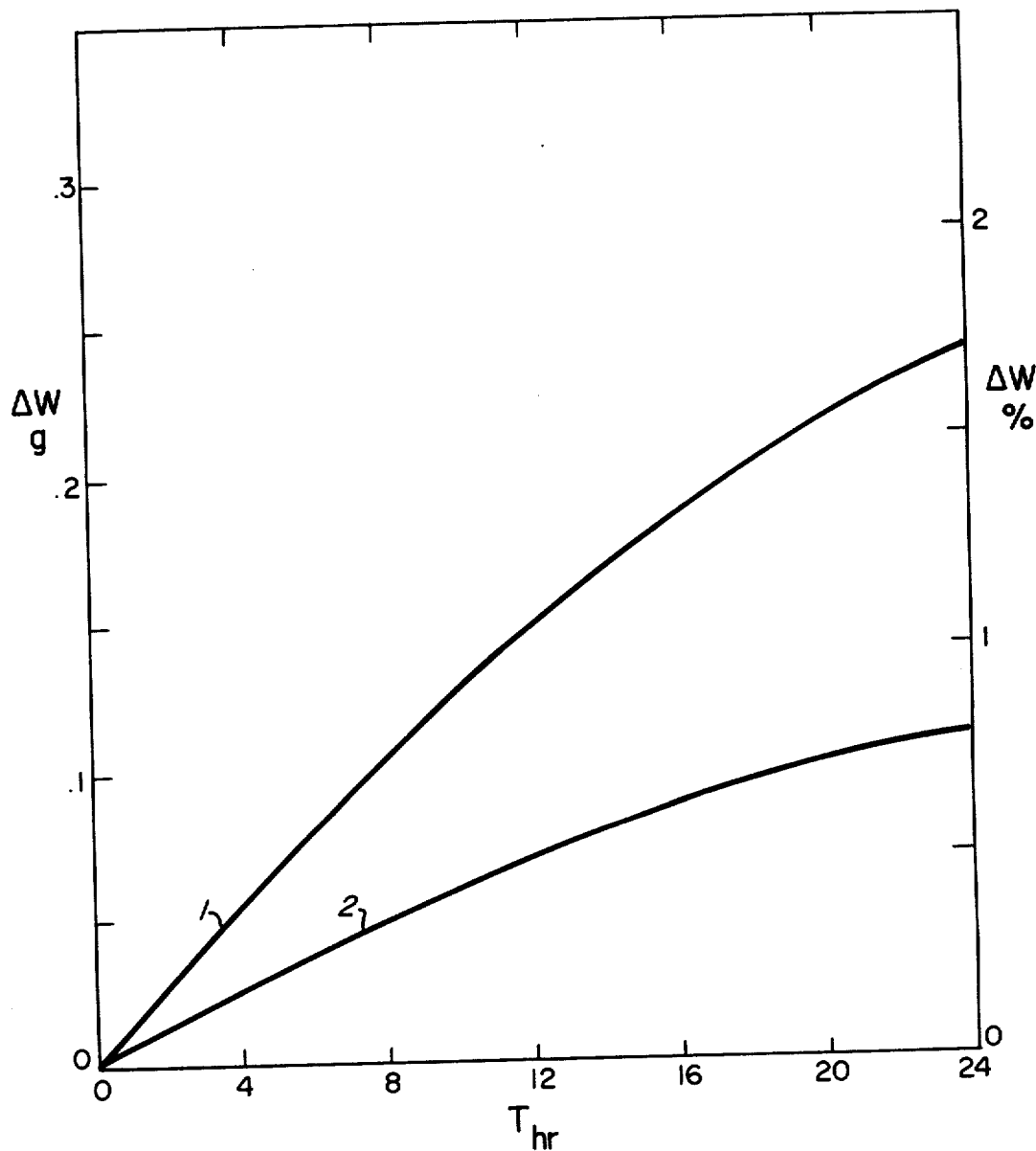
Figure 5:
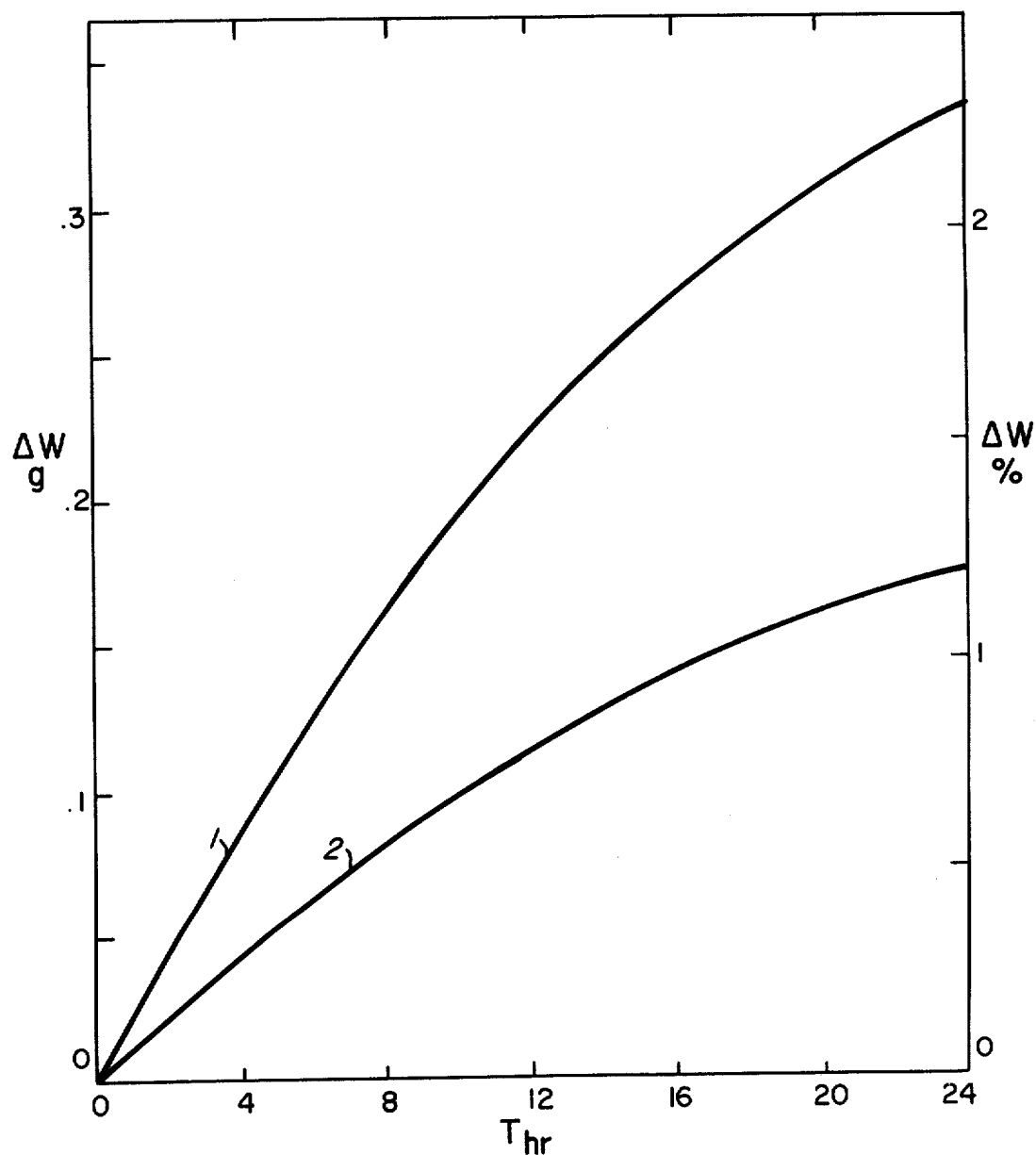

Moisture absorption data for commerically prepared electrodes treated in the manner described above, soluble silicate of lithium (weight ratio $SiO_2Li_2O$ of 9.5/1.0), 1 hour at 25° C, are shown in FIGS. 1 through 5. The data were taken at 100% relative humidity and 25° C. Data identified by 1 are the untreated commercial electrode performances; data identified by 2 are the treated performances. Moisture abosorption is plotted both as total weight gain in grams and % weight gain for the coating. The electrodes tested are representative of the following American Welding Society classifications: FIG. 1, E7018 low-hydrogen electrode; FIG. 2, E7014 cellulosic electrode; FIG. 3, E12018 low-alloy, low-hydrogen electrode; FIG. 4, E308-15 stainless electrode; and FIG. 5, E308-16 stainless electrode.

Welding tests were performed to compare the behavior of electrodes. Two electrodes of the E7018 type, one treated in the preferred manner and one untreated, were exposed to 100% RH and 40° C for 4 hours. In this time the treated electrode coating absorbed 0.07 g of moisture. The untreated electrode coating absorbed 0.20 g of moisture. When the two types of electrodes were used in welding using identical conditions in a circular patch cracking test, the weld made with the treated electrode was free from microcracks and slag entrapment while the weld made with the untreated electrode had a high incidence of microcracks and slag entrapment. In another test, two electrodes of the E9018 type, one treated in the preferred manner and one untreated, were exposed to 100% RH and 40° C for 2 hours. The treated electrode coating absorbed 0.04 g of moisture. The untreated electrode coating absorbed 0.12 g. When the two types were used in welding in a constrained fillet test under identical conditions, the treated electrode produced a sound weld while the untreated electrode produced a weld with underbead cracking.

Figure 6:
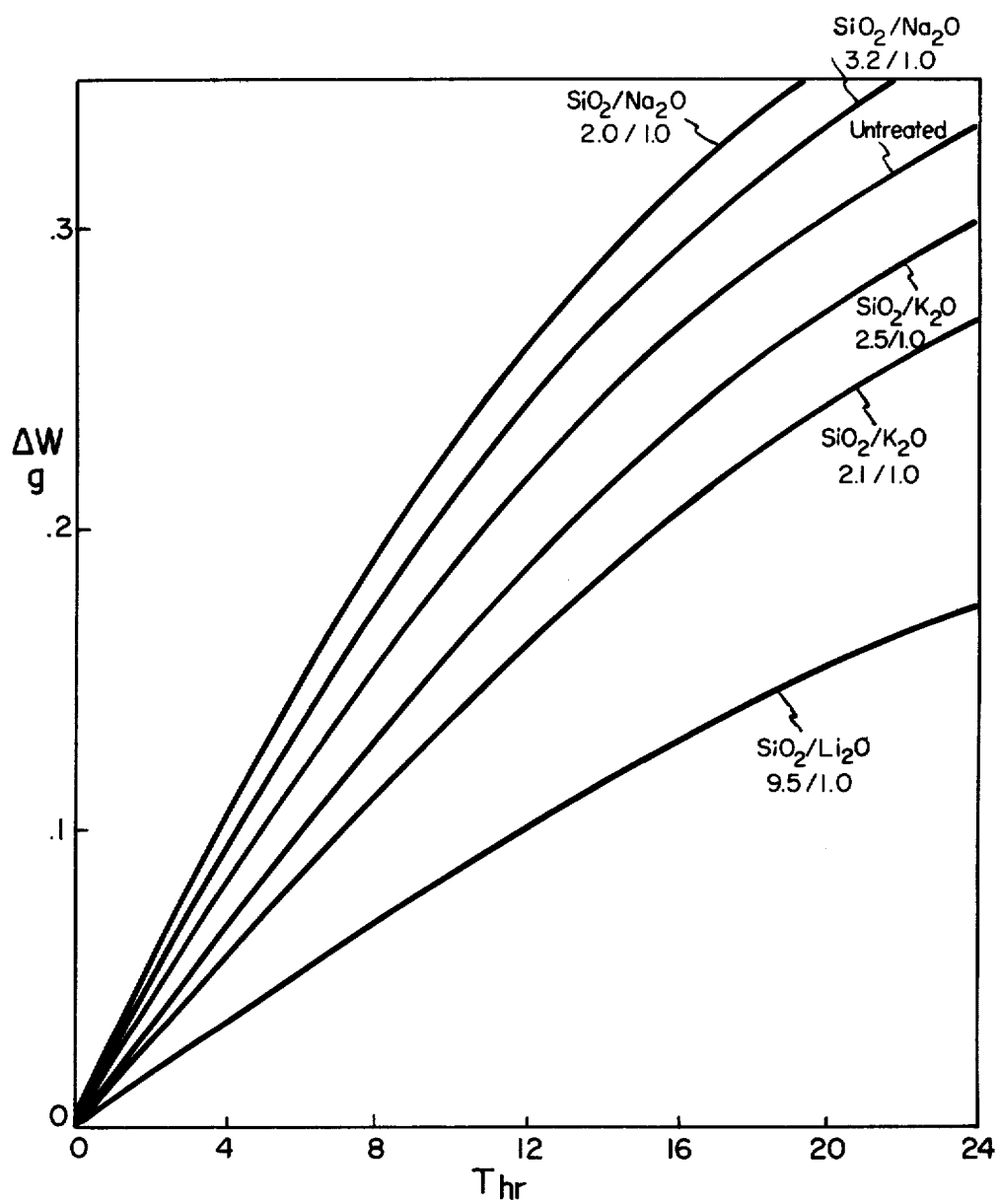

The comparative effects of 5 soluble silicate treatments, 2 sodium, 2 potassium and 1 lithium, on the moisture absorption characteristics of an E308-16 stainless electrode are shown in FIG. 6. All dispersions were prepared to 6% by weight $SiO_2$ and all treatment steps were identical. In comparing the results to the untreated electrode, note that, in order of decreasing effectiveness, the treatments were: lithium ($SiO_2/Li_2O$ of 9.5/1.0 by weight), potassium ($SiO_2/K_2O$ of 2.5/1.0 by weight) sodium ($SiO_2/Na_2O$ of 3.2/1.0 by weight) and sodium ($SiO_2/Na_2O$ of 2.0/1.0 by weight). The lithium treatment was very effective: the sodium treatments were not at all effective.

In actual practice the treatment of this invention may be applied to electrodes which have been made and stored or it may be applied to electrodes as they are being made in the first instance. However, in order for the treatment to be effective in the latter case, some type of drying treatment should be made to the electrode between extrusion of the coating onto the metal core and the treatment of this invention.

Also, it is possible to perform the treatment of this invention in two steps. Each treatment step being of a shorter duration than one long treatment step. Generally, if the treatment is performed in two steps, moisture resistance is superior to the moisture resistance achieved by one treatment step of temporal length equal to the two treatment steps.

The surface of the treated electrodes were examined using a Scanning Electron Microscope and an Energy Dispersive X-ray Analyzer. The film or layer on the coated electrode analyzed was significantly richer in silicon than the bulk coating. In the case of electrodes treated with a dispersion of a soluble silicate of lithium (weight ratio $SiO_2 Li_2O$ of 9.5/1.0), the film had a composition of about 20% Li; 27% Si; and 53% O by weight and was about 1 micrometer in thickness. When the electrodes are treated with a dispersion of a colloidal amorphous solid silica, the film is significantly richer in silicon than the bulk coating. In this case, the layer composition is about 47% Si, 53% O.

The use of this invention results in a $SiO_2$-rich film or layer on the outer surface of the bulk coating. In practice this layer is only partially continuous. This layer forms on the surface of the bulk coating and mechanically links with the surface by penetrating the surface pores of the bulk coating. Penetration occurs only near the surface and complete penetration of the bulk coating does not occur. The concentration of $SiO_2$-rich is essentially unity at the surface of the bulk coating and decreases rapidly within the bulk coating.

Having described the invention with reference to certain preferred embodiments, it should be obvious that minor modifications can be made to the dispersion recited or to the method of making and/or applying same to the covered electrodes without departing from the spirit and scope of the invention.

What is claimed is:

1. A method for treating the outer surfaces of covered electrodes to make them moisture resistant, comprising; forming an aqueous dispersion consisting of water and a silicon containing material selected from the class consisting of soluble amorphous solid silicas and soluble silicates of lithium and potassium in a concentration of from about 1 to 20% by weight silica; applying said aqueous dispersion to each covered electrode outer surface for a period of from about 1 minute to about 5 hours at a temperature of from about 5° to 95° C, and drying each electrode outer surface until essentially all of the water is driven off whereby a uniform and thin film deposit is formed upon each electrode outer surface having a composition containing substantially oxides of silicon, said film deposit being formed by mass transport of the silicon containing material through the aqueous dispersion.

2. Method according to claim 1 wherein said covered electrode is of the low-hydrogen type.

3. Method according to claim 1 wherein said covered electrode is of the non-low-hydrogen type.

4. A method for treating the outer surfaces of covered electrodes to make them moisture resistant, comprising: forming an aqueous dispersion consisting of water and a quatenary ammonium collodial silica sol having a weight ratio of $SiO_2/(NR_4)_2$ of .18/1.0 to 9.0/1.0 until the silica concentration is from about 1 to 20% by weight silica; applying said dispersion to each covered electrode outer surface for a period of from about 1 minute to about 5 hours at a temperature of from about 5° to 95° C, and drying each electrode outer surface until essentially all of the water is driven off whereby a uniform and thin film deposit is formed containing 10–90% silica.

5. A method for treating low-hydrogen type electrodes to make them moisture resistant, comprising: dispersing lithium silicate having a weight ratio $SiO_2/Li_2O$ of 9.5/1.0 in an aqueous medium until the silica concentration is about 6% by weight silica and applying such solution to a low-hydrogen type electrode for a period of about 60 minutes at a temperature of about 65° C and then drying such electrode to remove water until a uniform film deposit of about one micrometer in thickness is formed upon the electrode outer surface having a composition by weight comprising substantially oxides of silicon.

6. A method for treating low-hydrogen type electrodes to make them moisture resistant, comprising: dispersing a colloidal amorphous silica sol in water until the silica concentration is about 6% by weight silica and applying such solution to a low-hydrogen type electrode for a period of about 60 minutes at a temperature of about 65° C and then drying such electrode to remove water until a uniform thin film deposit is formed upon the electrode outer surface having a composition by weight consisting essentially of silica.

7. A method for treating low-hydrogen type electrodes to make them moisture resistant, comprising: dispersing precipitated silica in water until the silica concentration is about 2% by weight silica and applying such solution to a low-hydrogen type electrode for a period of about 60 minutes at a temperature of about 65° C and then drying such electrode to remove water until a thin film deposit is formed having a composition consisting essentially of silica, said film deposit being formed by mass transport of the silica through the solution.

* * * * *